United States Patent
Watanabe et al.

(10) Patent No.: US 11,270,691 B2
(45) Date of Patent: Mar. 8, 2022

(54) VOICE INTERACTION SYSTEM, ITS PROCESSING METHOD, AND PROGRAM THEREFOR

(71) Applicant: Toyota Jidosha Kabushiki Kaisha, Toyota (JP)

(72) Inventors: Narimasa Watanabe, Nagakute (JP); Sawa Higuchi, Toyota (JP); Tatsuro Hori, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 133 days.

(21) Appl. No.: 16/425,031

(22) Filed: May 29, 2019

(65) Prior Publication Data
US 2019/0371302 A1    Dec. 5, 2019

(30) Foreign Application Priority Data

May 31, 2018    (JP) .............................. JP2018-104982

(51) Int. Cl.
*G10L 15/18*       (2013.01)
*G06F 3/16*        (2006.01)
(Continued)

(52) U.S. Cl.
CPC .......... *G10L 15/1807* (2013.01); *G06F 3/167* (2013.01); *G06F 40/211* (2020.01);
(Continued)

(58) Field of Classification Search
CPC . G10L 15/1807; G10L 15/1822; G10L 15/22; G10L 15/28; G10L 15/19;
(Continued)

(56) References Cited

U.S. PATENT DOCUMENTS 5,357,596 A  * 10/1994  Takebayashi .............. G06F 3/16
                                                          704/251
6,731,307 B1 *  5/2004  Strubbe ................... G06N 3/004
                                                          704/E17.002
(Continued)

FOREIGN PATENT DOCUMENTS

JP    2010-197858 A    9/2010
JP    2010-217502 A    9/2010
(Continued)

OTHER PUBLICATIONS

Josuke Yamane et al., "Jointly Learning Hypernym-Hyponym Relations and their Clusters", Proceedings of the 22nd Annual Conference of the Speech Processing Society of Japan, Mar. 2016 (cited in specification at p. 12).

(Continued)

*Primary Examiner* — Anne L Thomas-Homescu
(74) *Attorney, Agent, or Firm* — Dinsmore & Shohl LLP (57) ABSTRACT

A voice interaction system performs a voice interaction with a user. The voice interaction system includes: topic detection means for estimating a topic of the voice interaction and detecting a change in the topic that has been estimated; and ask-again detection means for detecting, when the change in the topic has been detected by the topic detection means, the user's voice as ask-again by the user based on prosodic information on the user's voice.

6 Claims, 6 Drawing Sheets

(51) Int. Cl.
*G06F 40/211* (2020.01)
*G06F 40/284* (2020.01)
*G10L 15/08* (2006.01)

(52) U.S. Cl.
CPC ........ *G06F 40/284* (2020.01); *G10L 15/1822* (2013.01); *G10L 2015/088* (2013.01)

(58) Field of Classification Search
CPC ......... G10L 2015/088; G10L 2015/223; G10L 25/51; G06F 40/211; G06F 40/284
See application file for complete search history.

(56) References Cited

U.S. PATENT DOCUMENTS

| | | | | |
|---|---|---|---|---|
| 6,795,808 | B1* | 9/2004 | Strubbe | G10L 15/1822 |
| | | | | 704/275 |
| 9,014,365 | B1* | 4/2015 | Castiglione | G06Q 30/0255 |
| | | | | 379/265.09 |
| 9,875,740 | B1* | 1/2018 | Kumar | G10L 25/51 |
| 10,824,595 | B1* | 11/2020 | Gaeta | G06F 16/434 |
| 10,861,458 | B2* | 12/2020 | Watanabe | G06F 3/167 |
| 2002/0133355 | A1* | 9/2002 | Ross | G10L 15/1822 |
| | | | | 704/275 |
| 2005/0283473 | A1* | 12/2005 | Rousso | G06F 16/3322 |
| 2007/0260450 | A1* | 11/2007 | Sun | G06F 16/322 |
| | | | | 704/9 |
| 2007/0294229 | A1* | 12/2007 | Au | G06Q 30/02 |
| 2009/0210411 | A1* | 8/2009 | Murata | G10L 15/1822 |
| 2010/0286490 | A1* | 11/2010 | Koverzin | G16H 40/67 |
| | | | | 600/301 |
| 2011/0283190 | A1* | 11/2011 | Poltorak | H04L 12/2818 |
| | | | | 715/716 |
| 2013/0325447 | A1* | 12/2013 | Levien | G10L 15/30 |
| | | | | 704/201 |
| 2013/0339031 | A1* | 12/2013 | Yoon | H04N 21/42203 |
| | | | | 704/275 |
| 2014/0297281 | A1* | 10/2014 | Togawa | G10L 15/22 |
| | | | | 704/251 |
| 2015/0347385 | A1* | 12/2015 | Flor | G06F 40/216 |
| | | | | 704/9 |
| 2016/0104486 | A1* | 4/2016 | Penilla | G10L 15/005 |
| | | | | 704/232 |
| 2016/0180737 | A1* | 6/2016 | Clark | G06F 3/016 |
| | | | | 434/236 |
| 2017/0060839 | A1* | 3/2017 | Kawamura | G06F 40/30 |
| 2017/0069316 | A1* | 3/2017 | Makino | G10L 15/22 |
| 2017/0364741 | A1* | 12/2017 | Hau | G06K 9/72 |
| 2018/0113854 | A1* | 4/2018 | Vig | G06F 40/35 |
| 2018/0122377 | A1* | 5/2018 | Skantze | G10L 25/48 |
| 2018/0133900 | A1* | 5/2018 | Breazeal | B25J 19/026 |
| 2018/0233132 | A1* | 8/2018 | Herold | H04L 63/102 |
| 2018/0314689 | A1* | 11/2018 | Wang | G10L 15/22 |
| 2019/0027163 | A1* | 1/2019 | Mitsuyoshi | G06F 3/16 |
| 2019/0088252 | A1* | 3/2019 | Yoshida | G10L 15/07 |
| 2019/0279642 | A1* | 9/2019 | Shukla | G06K 9/00302 |
| 2019/0294676 | A1* | 9/2019 | Sapugay | G10L 15/22 |
| 2019/0304451 | A1* | 10/2019 | Sugiyama | G06F 3/16 |
| 2019/0319898 | A1* | 10/2019 | Scanlon | H04L 51/02 |
| 2019/0371305 | A1 | 12/2019 | Watanabe et al. | |
| 2019/0371318 | A1* | 12/2019 | Shukla | G10L 15/32 |
| 2020/0016745 | A1* | 1/2020 | Tang | G05B 13/042 |

FOREIGN PATENT DOCUMENTS

| | | |
|---|---|---|
| JP | 2014-095753 A | 5/2014 |
| JP | 2019211516 A | 12/2019 |

OTHER PUBLICATIONS

Yosuke Yamane et al., "Jointly Learning Hypernym-Hyponym Relations and their Clusters", Proceedings of the 22nd Annual Conference of the Speech Processing Society of Japan, Mar. 2016 (cited in specification at p. 12).

Gabriel Skantze, "Towards a General, Continuous Model of Turn-taking in Spoken Dialogue using LSTM Recurrent Neural Networks", Proceedings of the SIGDIAL 2017 Conference, Aug. 15-17, 2017, pp. 220-230, Association for Computational Linguistics (cited in specification at p. 12).

* cited by examiner

| TOPIC | WORD |
|---|---|
| MEAL | BREAKFAST, EAT, LUNCH, DINNER, MISO SOUP, CROQUETTE |
| HEALTH | WEIGHT, BLOOD PRESSURE, MEDICAL CHECKUP, HEALTH CHECK, DIET |
| FAMILY | MOTHER, GRANDCHILD, DAD, GRANDMA, GRANDDAD, GRANDMOTHER |

VOICE INTERACTION SYSTEM, ITS PROCESSING METHOD, AND PROGRAM THEREFOR

CROSS REFERENCE TO RELATED APPLICATIONS

This application is based upon and claims the benefit of priority from Japanese patent application No. 2018-104982, filed on May 31, 2018, the disclosure of which is incorporated herein in its entirety by reference.

BACKGROUND

The present disclosure relates to a voice interaction system that performs a voice interaction with a user, its processing method, and a program therefor.

A voice interaction system that recognizes a user's voice and detects when a word included in this voice coincides with a word registered in the voice interaction system, this voice as ask-again (see [0010] for an explanation of "ask-again") has been known (see Japanese Unexamined Patent Application Publication No. 2014-095753). Another voice interaction system that detects ask-again based on an interjection included in a user's voice has also been known (see Japanese Unexamined Patent Application Publication No. 2010-217502).

In the voice interaction system disclosed in Patent Literature 1, there are problems that it takes time to recognize a voice and ask-again cannot be detected for words that are not registered. In the voice interaction system disclosed in Patent Literature 2, there is a problem that voices that can be detected as ask-again are limited to voices that contain interjections and are thus extremely limited.

SUMMARY

The present disclosure has been made in order to solve the aforementioned problems, and the main object of the present disclosure is to provide a voice interaction system capable of detecting ask-again also for a wide range of voices that do not include interjections without requiring words for ask-again to be registered, its processing method, and a program therefor.

One aspect of the present disclosure to accomplish the aforementioned object is a voice interaction system that performs a voice interaction with a user, the system including: topic detection means for estimating a topic of the voice interaction and detecting a change in the topic that has been estimated; and ask-again detection means for detecting, when the change in the topic has been detected by the topic detection means, the user's voice as ask-again by the user based on prosodic information on the user's voice.

In this aspect, the voice interaction system may further include prosody detection means for analyzing the prosodic information on the user's voice and detecting an amount of change in prosody, in which the ask-again detection means may detect, when the change in the topic has been detected by the topic detection means and the amount of change in the prosody detected by the prosody detection means is equal to or larger than a predetermined amount, the user's voice as ask-again by the user.

In this aspect, the voice interaction system may include learning means for receiving the prosodic information and outputting an ask-again detection, and machine learning a relation between the prosodic information and the ask-again detection, in which the ask-again detection means may detect, when the change in the topic has been detected by the topic detection means, and the prosodic information on the user's voice has been received by the learning means and the learning means has output the ask-again detection, the user's voice as ask-again by the user.

In this aspect, the voice interaction system may further include response sentence generation means for generating, when the ask-again has been detected by the ask-again detection means, a response sentence for the ask-again in response to the ask-again, based on a response sentence responding to the user before the ask-again, in which the response sentence generation means may generate, when the response sentence includes a word whose frequency of appearance in a history of voice interaction with the user is equal to or smaller than a first predetermined value, the response sentence for the ask-again formed of only this word or the response sentence for the ask-again in which this word is emphasized in the response sentence.

One aspect of the present disclosure to accomplish the aforementioned object may be a method for a voice interaction system that performs a voice interaction with a user, the method including the steps of: estimating a topic of the voice interaction and detecting a change in the topic that has been estimated; and detecting, when the change in the topic has been detected, the user's voice as ask-again by the user based on prosodic information on the user's voice.

One aspect of the present disclosure to accomplish the aforementioned object may be a program for a voice interaction system that performs a voice interaction with a user, the program causing a computer to execute the following processing of: estimating a topic of the voice interaction and detecting a change in the topic that has been estimated; and detecting, when the change in the topic has been detected, the user's voice as ask-again by the user based on prosodic information on the user's voice.

According to the present disclosure, it is possible to provide a voice interaction system capable of detecting the ask-again also for a wide range of voices that do not include interjections without requiring the words for the ask-again to be registered in advance, its processing method, and a program therefor.

The above and other objects, features and advantages of the present disclosure will become more fully understood from the detailed description given hereinbelow and the accompanying drawings which are given by way of illustration only, and thus are not to be considered as limiting the present disclosure.

DETAILED DESCRIPTION

First Embodiment

Hereinafter, with reference to the drawings, embodiments of the present disclosure will be explained.

Figure 1:
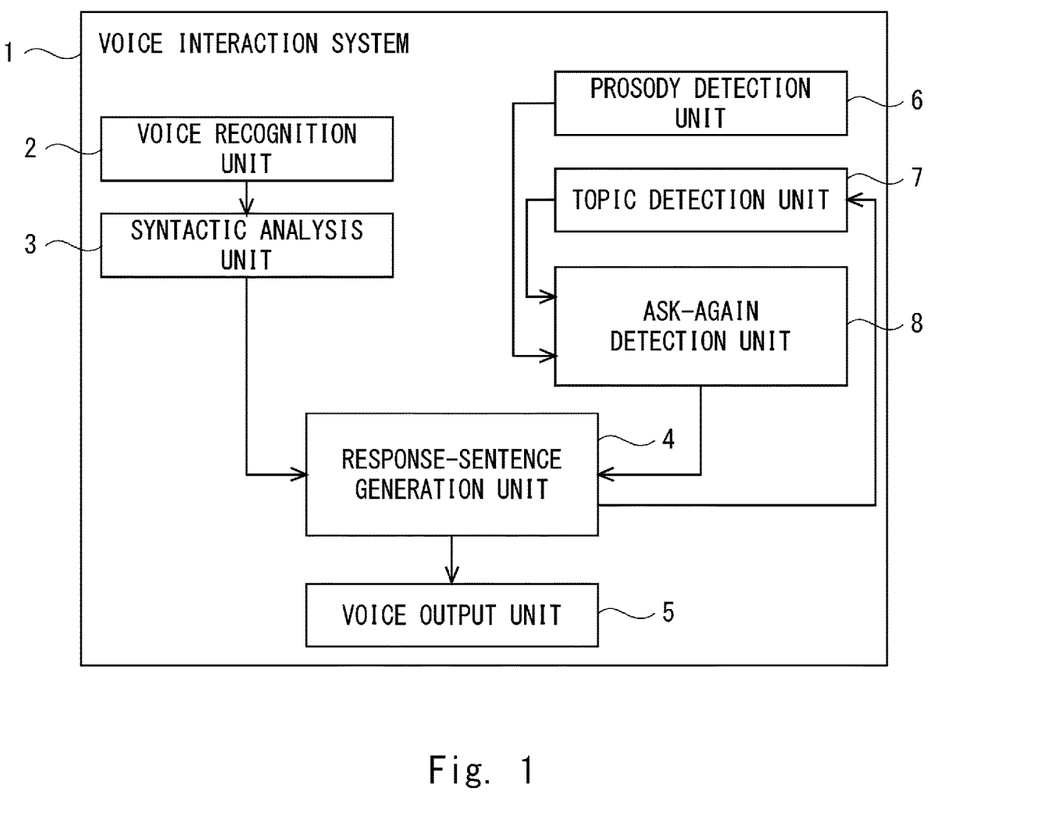
FIG. 1 is a block diagram showing a schematic system configuration of a voice interaction system according to a first embodiment of the present disclosure.

FIG. 1 is a block diagram showing a schematic system configuration of a voice interaction system according to a first embodiment of the present disclosure. A voice interaction system 1 according to the first embodiment is installed, for example, in a robot, a Personal Computer (PC), a mobile terminal (such as a smartphone or a tablet computer), a navigation device or the like, and performs a conversation with a user.

In a case in which the user could not hear the voice of the voice interaction system 1 when the user performs a voice interaction with the voice interaction system 1, the user asks again, for example, "Could you repeat it again?" (hereinafter this user's action is referred to as ask-again). The voice interaction system 1 according to the first embodiment detects the "ask-again" by the user.

The voice interaction system 1 according to the first embodiment includes a voice recognition unit 2 configured to recognize a user's voice, a syntactic analysis unit 3 configured to analyze a sentence structure of the voice, a response-sentence generation unit 4 configured to generate a response sentence in response to the user's voice, a voice output unit 5 configured to output a voice, a prosody detection unit 6 configured to detect an amount of change in the prosody of the user's voice, a topic detection unit 7 configured to detect a change in the topic, and an ask-again detection unit 8 configured to detect the ask-again by the user.

Note that the voice interaction system 1 is formed by, for example, hardware mainly using a microcomputer including a Central Processing Unit (CPU) that performs arithmetic processing and so on, a memory that is composed of a Read Only Memory (ROM) and a Random Access Memory (RAM) and stores an arithmetic program executed by the CPU and the like, an interface unit (I/F) that externally receives and outputs signals, and so on. The CPU, the memory, and the interface unit are connected with one another through a data bus or the like.

The voice recognition unit 2 performs, for example, a voice recognition process based on information on a user's voice input through a microphone, converts the information on the user's voice into text, and thereby recognizes it as character-string information.

For example, the voice recognition unit 2 converts the information on the user's voice input through a microphone into a digital signal. The voice recognition unit 2 performs voice recognition by detecting a speech section from the above-described digitized information and performing pattern matching for voice information in the detected speech section by referring to a statistical linguistic model or the like.

Note that the statistical linguistic model is, for example, a probability model used to calculate an occurrence probability of a linguistic expression, such as an occurrence distribution of a word and a distribution of a word that occurs after a certain word, and is obtained by learning connection probabilities on a morpheme basis. The statistical linguistic model is stored in advance in the memory or the like. The voice recognition unit 2 generates part-information-added morpheme information for each morpheme in the user's voice information, i.e., information obtained by adding a type of a part (such as a noun, an adjective, a verb, an adjective, etc.) to each morpheme. The voice recognition unit 2 outputs the recognized user's voice information to the syntactic analysis unit 3.

The syntactic analysis unit 3 analyzes a sentence structure of the voice information recognized by the voice recognition unit 2. For example, the syntactic analysis unit 3 performs a morpheme analysis or the like for character-string information representing the vocally-recognized user's voice information by using an ordinary morpheme analyzer and performs a semantic analysis for the character-string information. The syntactic analysis unit 3 outputs a result of the analysis of the character-string information (including morpheme information, modification information, text obtained by the recognition, etc.) to the response-sentence generation unit 4.

The response-sentence generation unit 4 generates a response sentence to the user's voice information based on a result of the analysis of the voice information analyzed by the syntactic analysis unit 3.

For example, the response-sentence generation unit 4 generates a response sentence to the user's voice information based on a result of the analysis of the character-string information output from the syntactic analysis unit 3. More specifically, the response-sentence generation unit 4 extracts one predicate term "play go" from character-string information "I play go". The syntactic analysis unit 3 performs emotion discrimination (negative and positive) using the extracted morpheme string "play go" as a feature vector and using a Support Vector Machine (SVM) model.

When the result of the emotion discrimination is positive, the response-sentence generation unit 4 generates a response sentence "That sounds good". On the other hand, when the result of the emotion discrimination is negative, the response-sentence generation unit 4 generates a response sentence "It seems to be troublesome". The aforementioned method of generating the response sentence is merely one example, and is not limited to this one. A desired generation method may be used. The response-sentence generation unit 4 outputs the response sentence that has been generated to the voice output unit 5.

The voice output unit 5 outputs the response sentence generated by the response-sentence generation unit 4 by voice. The voice output unit 5 outputs, for example, the voice of the response sentence to the user using a speaker or the like.

Incidentally, in voice interaction systems according to related art, there are problems that it takes time to recognize a voice and ask-again cannot be detected for words that are not registered. There is also a problem in voice interaction systems according to related art that voices that can be detected as the ask-again are limited to voices that contain interjections and are thus extremely limited.

On the other hand, the voice interaction system 1 according to the first embodiment detects, when a change in the topic has been detected by the topic detection unit 7, the user's voice as the ask-again by the user based on prosodic information on the user's voice.

When the topic of the voice interaction is changed, it may be difficult for the user to hear the voice and the ask-again tends to occur easily. Further, there is a characteristic change in the prosody in the voice of the ask-again. Based on this characteristic, as described above, in the voice interaction system 1 according to the first embodiment, when a change in the topic has been detected, the user's voice is detected as the ask-again by the user based on the prosodic information on the user's voice. Accordingly, it is possible to detect the ask-again, also for a wide range of voices that do not include interjections without requiring the words for the ask-again as described above to be registered in advance.

Further, by detecting the ask-again based on the change in the topic and the prosodic information, processing delay is not likely to occur, and it is possible to improve the accuracy of detecting the ask-again without depending on the language of the ask-again and the accuracy of the voice recognition.

The prosody detection unit 6 is one specific example of prosody detection means. The prosody detection unit 6 analyzes, for example, prosodic information on the user's voice input via a microphone, and detects the amount of change in the prosody. When the user's voice is the ask-again, characteristics appear at the end of the voice. Therefore, the prosody detection unit 6 divides, for example, a predetermined period of the end of the user's voice into two parts, and detects the difference (or the inclination) between the average value of the height of the voice in the first half section and the average value of the height of the voice in the latter half section as the amount of change in the prosody.

Figure 2:
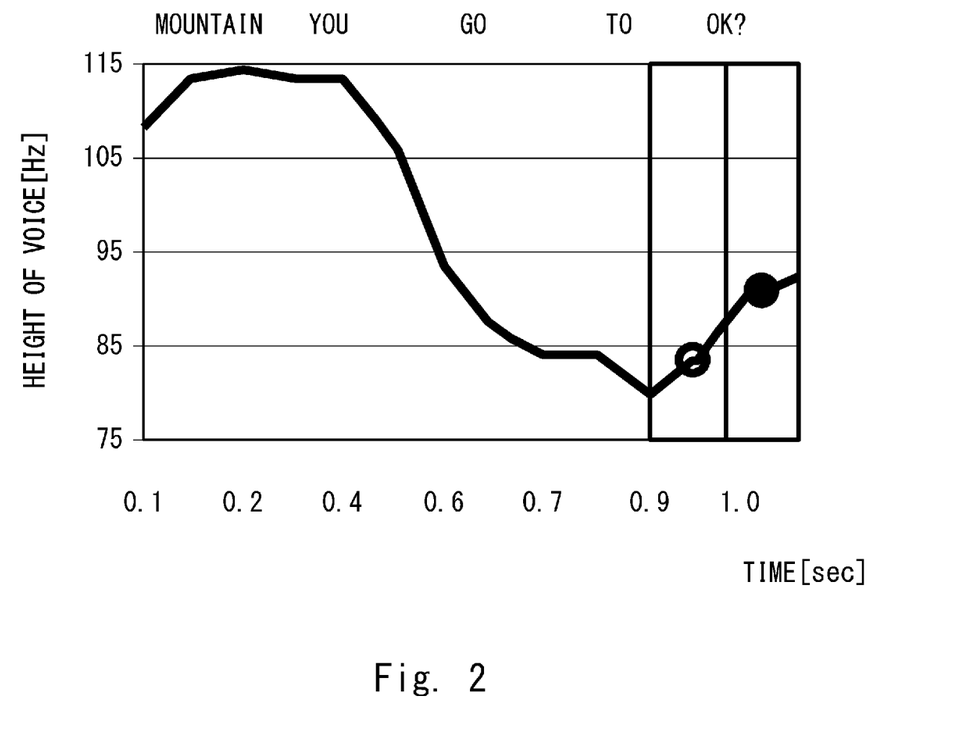
FIG. 2 is a diagram showing a change in prosody.

More specifically, as shown in FIG. 2, the prosody detection unit 6 detects the difference between the average value of the height of the voice for 100 milliseconds at the end of the user's voice "Go to a mountain" and the average value of the height of the voice for 100 milliseconds just before that as the amount of change in the prosody. The prosody detection unit 6 outputs the amount of the change in the prosody that has been detected to the ask-again detection unit 8.

The topic detection unit 7 is one specific example of topic detection means. The topic detection unit 7 estimates the topic of the voice interaction based on the words that appear in the response sentence generated by the response-sentence generation unit 4. The topic detection unit 7 estimates the topic by comparing the words in the response sentence with table information set in the memory in advance.

Figure 3:
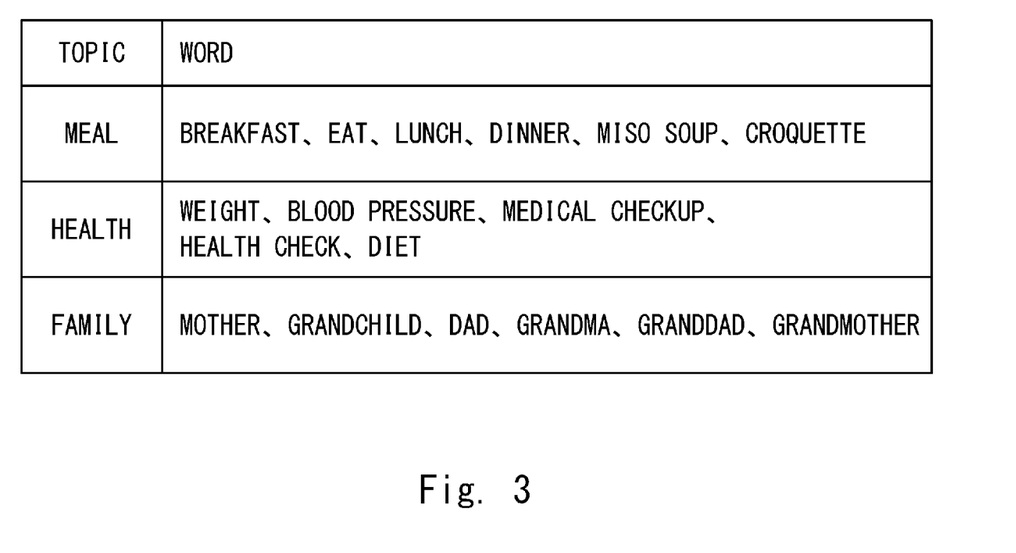
FIG. 3 is a diagram showing one example of table information.

As shown in FIG. 3, in the table information, the topics and the words included in the respective topics are associated with each other. The topic detection unit 7 estimates the topic that includes the largest number of words in the table information from among the topics in the table information. When the number of words that have appeared in one topic is the same as that in another topic, the topic detection unit 7 may estimate the highest-order topic in the table information.

The topic detection unit 7 compares, for example, the words "breakfast", "a lot", "ate" in the response sentence "I ate a lot of breakfast" with the table information. The topic detection unit 7 estimates the topic "meal" that includes the largest number of words in the table information "breakfast", "eat" from among the topics "meal", "health", and "family" in the table information. The aforementioned method of estimating the topic in the topic detection unit 7 is merely an example, and this embodiment is not limited thereto.

The topic detection unit 7 may estimate the topic of the voice interaction based on the words that appear in the user's voice input the microphone. The topic detection unit 7 estimates the topic by comparing the words in the user's voice with the table information set in the memory in advance.

As described above, the topic detection unit 7 estimates the topic of the voice interaction and detects a change in the topic that has been estimated. When, for example, the topic that has been estimated has been changed from "meal" to "health", the topic detection unit 7 detects the change in the topic.

The ask-again detection unit 8 is one specific example of ask-again detection means. As described above, when a change in the topic has been detected by the topic detection unit 7, the ask-again detection unit 8 detects the user's voice as the ask-again by the user based on the prosodic information on the user's voice.

When the user's voice is ask-again, as shown in FIG. 2, the amount of change in the prosody becomes large at the end of the voice. This is because in the case of the ask-again, the user speaks as if he/she is asking a question, which makes the tone at the end of the voice high.

Accordingly, the ask-again detection unit 8 detects the user's voice as the ask-again by the user when, for example, the change in the topic is detected by the topic detection unit 7 and the amount of change in the prosody detected by the prosody detection unit 6 is high, that is, equal to or larger than a predetermined amount. The amount of change in the prosody at the end of the voice at the time of ask-again is experimentally obtained in advance as the predetermined amount, and this predetermined amount is set in the memory. When the ask-again detection unit 8 detects the ask-again, the ask-again detection unit 8 outputs a detection signal indicating the result to the response-sentence generation unit 4.

The response-sentence generation unit 4 is one specific example of response sentence generation means. When the response-sentence generation unit 4 receives the detection signal from the ask-again detection unit 8, the response-sentence generation unit 4 generates the response sentence for the ask-again based on the response sentence output just before the user's voice of ask-again. The response-sentence generation unit 4 directly re-generates, for example, the response sentence output just before the user's voice of ask-again as the response sentence for the ask-again. It is therefore possible to easily generate the response sentence for the ask-again.

It is possible that, when there are words that are difficult for the user to hear in the response sentence for the ask-again, the user may still not be able to easily hear the response sentence even when this response sentence is repeated.

On the other hand, the response-sentence generation unit 4 generates, when the response sentence responding to the user just before the ask-again includes a word whose frequency of appearance in the history of voice interaction with the user is equal to or smaller than a first predetermined value, the response sentence for the ask-again formed of only this word.

The response-sentence generation unit 4 generates, for example, for the response sentence just before the ask-again "I went to Gifu to play golf", the response sentence for the ask-again "golf", which is formed of only the word "golf" whose frequency of appearance is equal to or smaller than the first predetermined value.

It can be estimated that words that are not likely to appear frequently in the history of voice interaction with the user (hereinafter this history will be referred to as a voice interaction history) are the words unfamiliar to the user and thus the words that are difficult for the user to hear. Accordingly, when the response sentence just before the ask-again includes words whose frequency of appearance in the history of voice interaction with the user is low, that is, equal to or smaller than the first predetermined value, the response-sentence generation unit 4 generates the response sentence for the ask-again formed of only the words difficult for the user to hear. Accordingly, by extracting and emphasizing only the word that is especially difficult for the user to hear, it becomes possible for the user to easily hear this word. That is, when the ask-again by the user is detected, it is possible to generate and output the response sentence that the user can easily hear.

The voice interaction history, which is a history of the voice interaction performed between the user and the voice interaction system 1, includes a plurality of voice interactions. The voice interaction history is sequentially stored in the memory or the like. For example, the frequency of appearance of the word when it is determined that it is difficult for the user to hear this word is experimentally obtained in advance as the first predetermined value, and this first predetermined value is stored in the memory.

When the response sentence just before the ask-again includes a word whose frequency of appearance in the voice interaction history is equal to or smaller than the first predetermined value, the response-sentence generation unit 4 may generate the response sentence for the ask-again in which this word is emphasized in the response sentence. Accordingly, by emphasizing and accentuating the word that is especially difficult for the user to hear, it becomes possible for the user to easily hear this word. That is, when the ask-again by the user is detected, it is possible to generate and output the response sentence that the user can easily hear.

The response-sentence generation unit 4 makes, for example, the voice speed of the word lower than the voice speed of the words other than this word in the response sentence just before the ask-again. Accordingly, it is possible to specifically accentuate this word whose voice speed is low and further emphasize this word in the response sentence for the ask-again so that the user will be able to easily hear this word.

The response-sentence generation unit 4 makes the volume of the word larger than the volume of the words other than the word in the response sentence just before the ask-again. Accordingly, it is possible to specifically accentuate this word whose volume is large and further emphasize this word in the response sentence for the ask-again so that the user will be able to easily hear this word. The voice speed and the volume at which the user can easily hear the word are experimentally obtained and this voice speed and the volume are set in the memory.

The response-sentence generation unit 4 makes, in the response sentence just before the ask-again, a space between the word and the preceding and following words. Accordingly, it is possible to specifically accentuate this word and further emphasize this word in the response sentence for the ask-again so that the user will be able to easily hear this word.

Further, the response-sentence generation unit 4 may generate the response sentence for the ask-again by arbitrarily combining the aforementioned methods in the response sentence just before the ask-again. The response-sentence generation unit 4 may generate, for example, the response sentence for the ask-again in which the voice speed and the volume of the word are made lower than the voice speed and the volume of the words other than this word in the response sentence just before the ask-again.

The response-sentence generation unit 4 outputs the response sentence for the ask-again that has been generated to the voice output unit 5. The voice output unit 5 outputs the response sentence for the ask-again generated by the response-sentence generation unit 4 by voice. Accordingly, the voice interaction system 1 is able to appropriately respond to the ask-again by the user.

Figure 4:
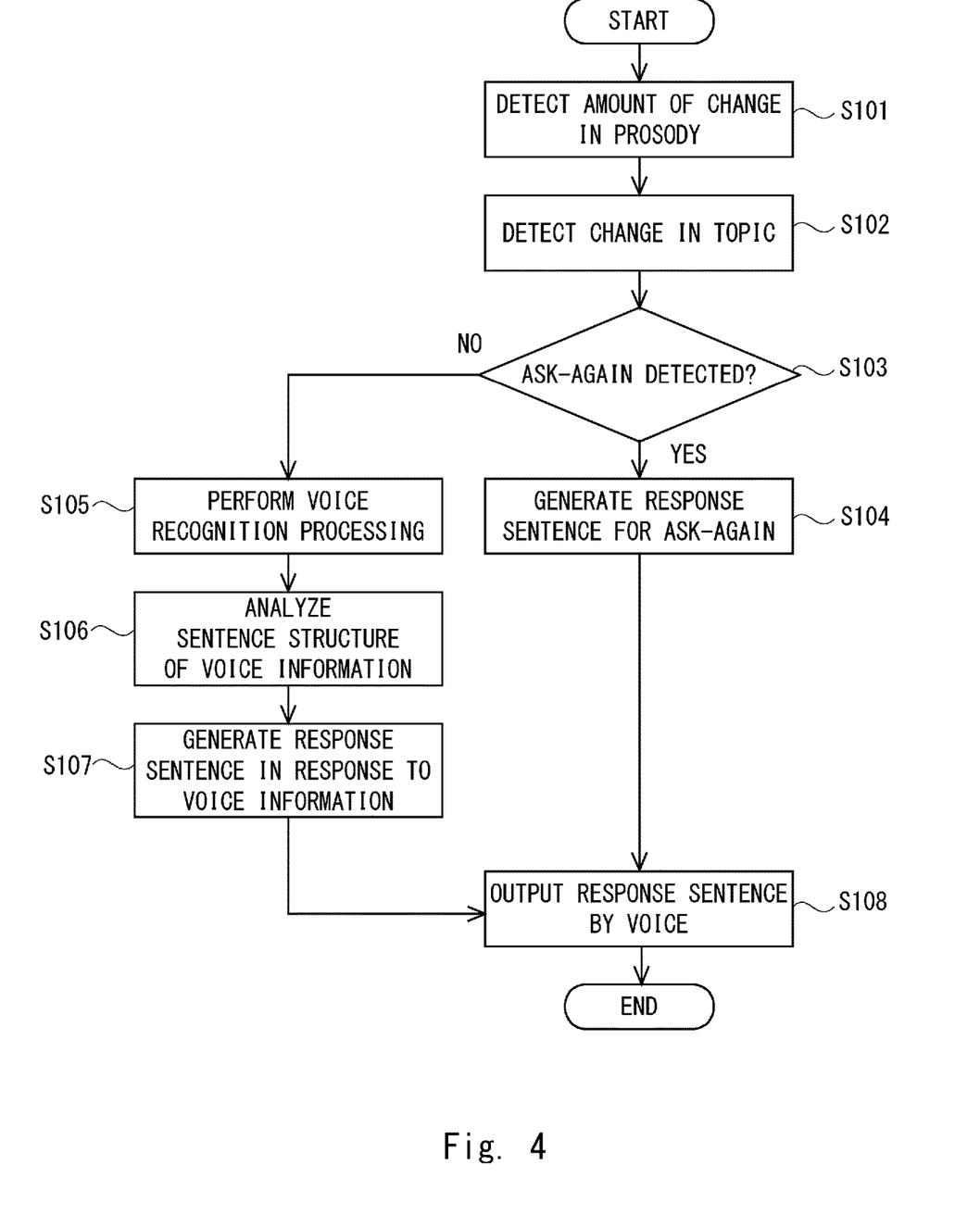
FIG. 4 is a flowchart showing a flow of a processing method for the voice interaction system according to the first embodiment of the present disclosure.

FIG. 4 is a flowchart showing a flow of a processing method for the voice interaction system according to the first embodiment of the present disclosure. The prosody detection unit 6 analyzes the prosody of the user's voice input via a microphone and detects the amount of change in the prosody (Step S101).

The topic detection unit 7 estimates the topic of the voice interaction and detects the change in the topic that has been estimated (Step S102). The ask-again detection unit 8 detects the user's voice as the ask-again by the user when the change in the topic has been detected by the topic detection unit 7 and the amount of change in the prosody detected by the prosody detection unit 6 is equal to or larger than a predetermined amount (Step S103).

When the ask-again detection unit 8 has detected the ask-again (YES in Step S103), the response-sentence generation unit 4 generates the response sentence for the ask-again (Step S104), outputs the response sentence that has been generated to the voice output unit 5, and then the process proceeds to (Step S108) that will be explained later.

On the other hand, when the ask-again detection unit 8 has not detected the ask-again (NO in Step S103), the voice recognition unit 2 performs voice recognition processing based on the information on the user's voice, converts the information on the user's voice into text, recognizes it as the character string information, and outputs the information on the users voice that has been recognized to the syntactic analysis unit 3 (Step S105).

The syntactic analysis unit 3 analyzes the sentence structure of the voice information recognized by the voice recognition unit 2 and outputs the results of the analysis to the response-sentence generation unit 4 (Step S106). The response-sentence generation unit 4 generates the response sentence in response to the information on the user's voice based on the result of the analysis of the voice information analyzed by the syntactic analysis unit 3 (Step S107). The voice output unit 5 outputs the response sentence generated by the response-sentence generation unit 4 by voice (Step S108).

As described above, when a change in the topic has been detected by the topic detection unit 7, the voice interaction system 1 according to the first embodiment detects the user's voice as the ask-again by the user based on the prosodic information on the user's voice. Accordingly, it is possible to detect the ask-again also for a wide range of voices that do not include interjections without requiring the words for the ask-again to be registered in advance.

Second Embodiment

Figure 5:
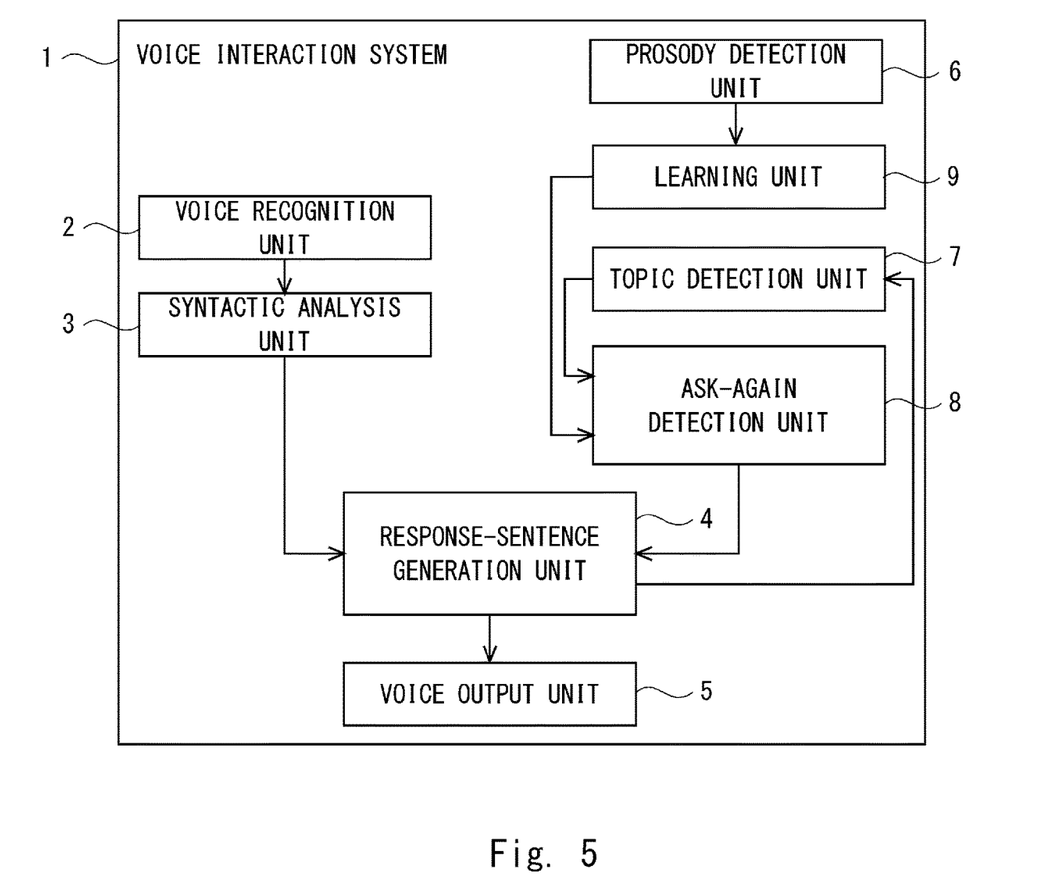
FIG. 5 is a block diagram showing a schematic system configuration of a voice interaction system according to a second embodiment of the present disclosure.

FIG. 5 is a block diagram showing a schematic system configuration of a voice interaction system according to a second embodiment of the present disclosure. A voice interaction system 20 according to the second embodiment further includes a learning unit 9 that receives the prosodic information on the user's voice, outputs the ask-again detection, and machine-learns the relation between the prosodic information on the user's voice and the ask-again detection.

The learning unit 9 is one specific example of learning means. The learning unit 9 performs learning in advance using learning data in which the prosodic information on the user's voice at the time of ask-again, which is an and the ask-again detection, which is an output, are associated with each other. The learning unit 9 is formed of, for example, a neural network such as a Recurrent neural Network (RNN). This RNN includes a Long Short Term Memory (LSTM) in its intermediate layer. The learning unit 9 performs learning of the change in the prosody of the user's voice at the time of ask-again and captures the characteristics thereof, whereby it is possible to detect the ask-again with a higher accuracy.

The configuration of the aforementioned learning unit 9 is disclosed in detail in, for example, Towards a General, Continuous Model of Turn-taking in Spoken Dialogue using LSTM Recurrent Neural Networks, Sigdial 2017, the disclosure of which is incorporated herein by reference.

The learning unit 9 may be composed of a learning device such as a Support Vector Machine (SVM) in place of the neural network.

The topic detection unit 7 may specify, based on the word vector of the response sentence generated by the response-sentence generation unit 4, the higher concept word of this word, and estimate the topic. It is therefore possible to estimate an unknown topic that is not stored in the table information.

The aforementioned estimation method is disclosed in detail in "Jointly Learning Hypernym-Hyponym Relations and their Clusters, Josuke Yamane, Tomoya Takatani, Hitoshi Yamada, Makoto Miwa, and Yutaka Sasaki, The 22nd Annual Meeting of the Association for Natural Language Processing, B3-4, Sendai, 2016", the disclosure of which is incorporated herein by reference.

There is a case in which the interaction with the user proceeds mainly by the voice interaction system 1. In this case, the topic regarding which the voice interaction system 1 performs a voice interaction with the user is set in the voice interaction system 1 in advance. Accordingly, the topic detection unit 7 may estimate the topic of the voice interaction that has been set in advance. It is therefore possible to definitely estimate the topic of the voice interaction.

As described above, the topic detection unit 7 estimates the topic of the voice interaction and detects the change in the topic that has been estimated. The ask-again detection unit 8 detects the user's voice as the ask-again by the user when the change in the topic has been detected by the topic detection unit 7, the prosodic information on the user's voice from the prosody detection unit 6 has been input to the learning unit 9, and the learning unit 9 has output the ask-again detection.

Figure 6:
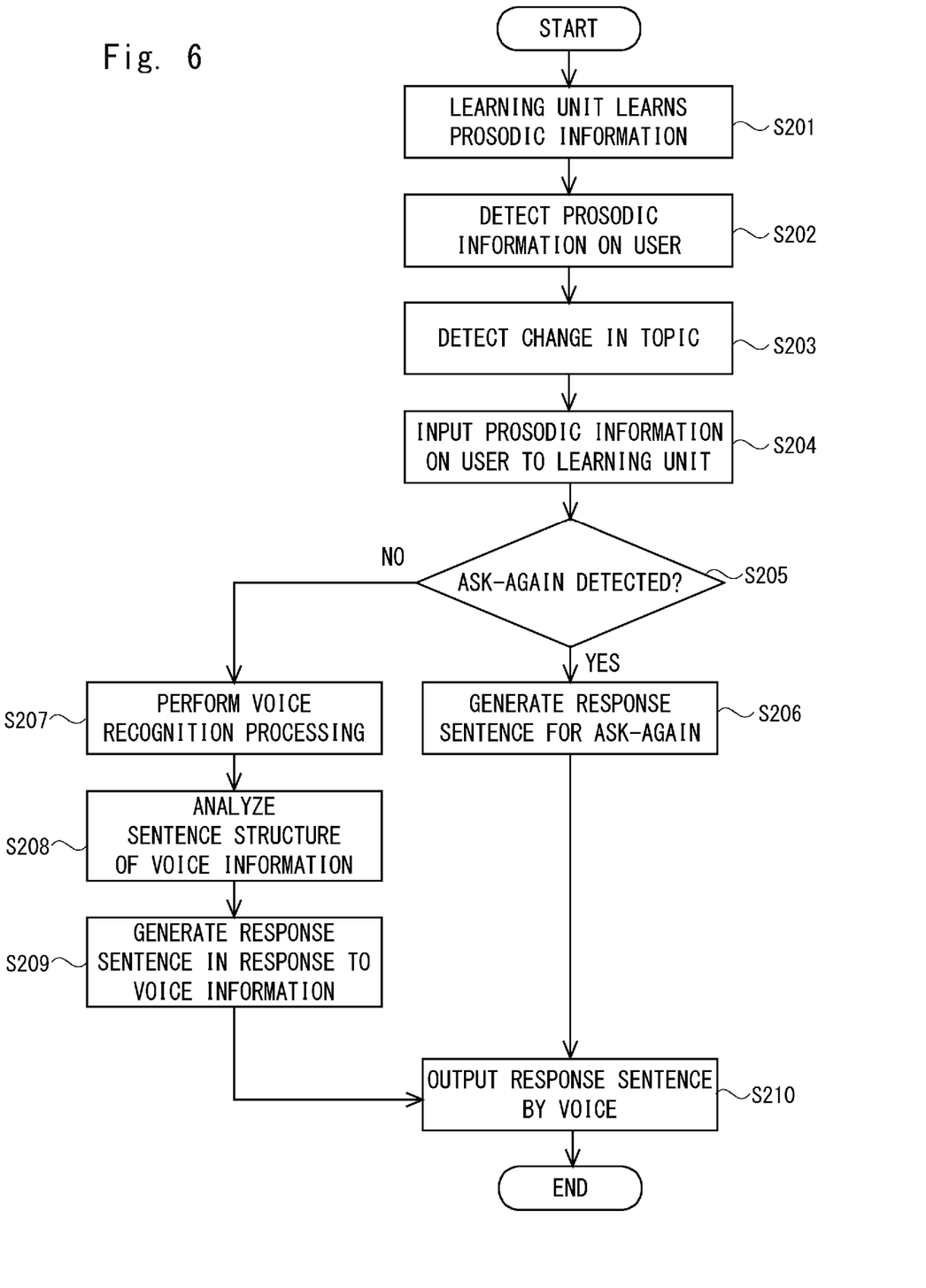
FIG. 6 is a flowchart showing a flow of a processing method for the voice interaction system according to the second embodiment of the present disclosure.

FIG. 6 is a flowchart showing a flow of the processing method for the voice interaction system according to the second embodiment of the present disclosure. The learning unit 9 performs learning using learning data in which the prosodic information on the user's voice at the time of ask-again and the ask-again detection are associated with each other (Step S201).

The prosody detection unit 6 analyzes the prosody of the user's voice input via a microphone and detects the prosodic information (the amount of change in the prosody etc.) (Step S202). The topic detection unit 7 specifies, based on the word vector of the response sentence generated by the response-sentence generation unit 4, the higher concept word of this word, estimates the topic, and detects the change in the topic that has been estimated (Step S203).

The prosodic information on the user's voice is input to the learning unit 9 from the prosody detection unit 6 (Step S204). The ask-again detection unit 8 detects the user's voice as the ask-again by the user when the change in the topic has been detected by the topic detection unit 7 and the learning unit 9 has output the ask-again detection (Step S205).

When the ask-again detection unit 8 has detected the ask-again (YES in Step S205), the response-sentence generation unit 4 generates the response sentence for the ask-again (Step S206), outputs the response sentence that has been generated to the voice output unit 5, and then the process proceeds to (Step S210) that will be explained later.

When the ask-again detection unit 8 has not detected the ask-again (NO in Step S205), the voice recognition unit 2 performs voice recognition processing based on the information on the user's voice, converts the information on the user's voice into text, recognizes the character string information, and outputs the information on the user's voice that has been recognized to the syntactic analysis unit 3 (Step S207).

The syntactic analysis unit 3 analyzes the sentence structure of the voice information recognized by the voice recognition unit 2 and outputs the result of the analysis to the response-sentence generation unit 4 (Step S208). The response-sentence generation unit 4 generates the response sentence in response to the information on the user's voice based on the sentence structure of the voice information analyzed by the syntactic analysis unit 3 (Step S209). The voice output unit 5 outputs the response sentence generated by the response-sentence generation unit 4 by voice (Step S210).

While some embodiments of this disclosure have been described above, these embodiments are presented as examples and not intended to limit the scope of the disclosure. These novel embodiments can be implemented in other various forms, and various types of omissions, substitutions, or changes can be made without departing from the spirit of the disclosure. These embodiments and their modifications as would fall within the scope and spirit of the disclosure, are included in the disclosure provided in the claims and the scope of equivalents thereof.

The present disclosure is able to achieve, for example, the processing shown in FIGS. 4 and 6 by causing a CPU to execute a computer program.

The program(s) can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magnetooptical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.).

Further, the program(s) may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A voice interaction system that performs a voice interaction with a user, the system comprising:

a processor programmed to estimate a topic of the voice interaction and detect a change in the topic that has been estimated; and detect, in response to detecting the change in the topic by the processor, the user's voice uttered after the detection of the change in the topic as ask-again by the user based on an amount of change in prosody of the user's voice, wherein the ask-again is an ask for the voice interaction system to repeat an utterance.

2. The voice interaction system according to claim 1, wherein the processor is further programmed to:

detect, in response to detecting the change in the topic and determining that the amount of change in the prosody detected by the processor is equal to or larger than a predetermined amount, the user's voice as ask-again by the user.

3. The voice interaction system according to claim 1, wherein the processor is further programmed to:

receive prosodic information on the user's voice and output an ask-again detection, and machine learn a relation between the prosodic information and the ask-again detection, and detect, in response to detecting the change in the topic, receiving the prosodic information on the user's voice and outputting the ask-again detection, the user's voice as ask-again by the user.

4. The voice interaction system according to claim 1, wherein the processor is further programmed to:

generate, in response to detecting the ask-again, a response sentence for the ask-again in response to the ask-again, based on a response sentence responding to the user before the ask-again, and generate, when the response sentence includes a word whose frequency of appearance in a history of voice interaction with the user is equal to or smaller than a first predetermined value, the response sentence for the ask-again formed of only this word or the response sentence for the ask-again in which this word is emphasized in the response sentence.

5. A processing method for a voice interaction system that performs a voice interaction with a user, the method comprising the steps of:

collecting, by a microphone of the voice interaction system, voice inputs of the user;

estimating, by a processor of the voice interaction system, a topic of the voice interaction based on the voice inputs and detecting a change in the topic that has been estimated; and detecting, by the processor of the voice interaction system, in response to detecting the change in the topic, the user's voice uttered after the detection of the change in the topic as ask-again by the user based on an amount of change in prosody of the user's voice, wherein the ask-again is an ask for the voice interaction system to repeat an utterance.

6. A non-transitory computer readable medium storing a program for a voice interaction system that performs a voice interaction with a user, the program causing a computer to execute the following processing of:

estimating a topic of the voice interaction and detecting a change in the topic that has been estimated; and detecting, in response to detecting the change in the topic, the user's voice uttered after the detection of the change in the topic as ask-again by the user based on an amount of change in prosody of the user's voice, wherein the ask-again is an ask for the voice interaction system to repeat an utterance.

\* \* \* \* \*